Aug. 4, 1936. A. A. GORDON 2,049,584
ELECTRICAL WEFT DETECTING MECHANISM FOR PICK-AND-PICK LOOMS
Filed April 13, 1933 6 Sheets-Sheet 1

Aug. 4, 1936.   A. A. GORDON   2,049,584
ELECTRICAL WEFT DETECTING MECHANISM FOR PICK-AND-PICK LOOMS
Filed April 13, 1933   6 Sheets—Sheet 2

INVENTOR
A. A. GORDON
Southgate Hayes Hawley
Attorneys

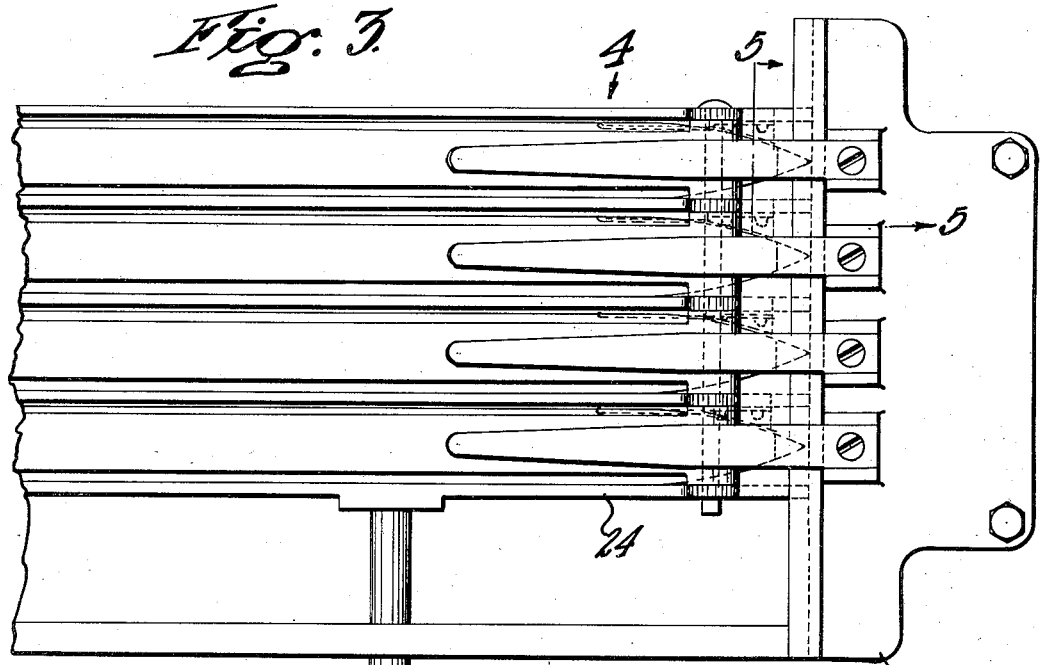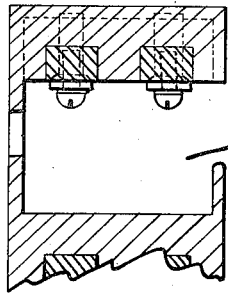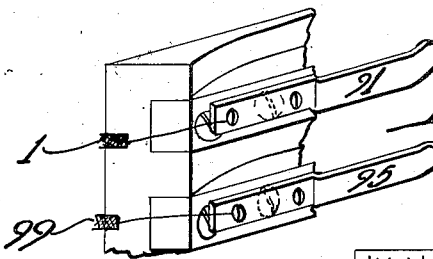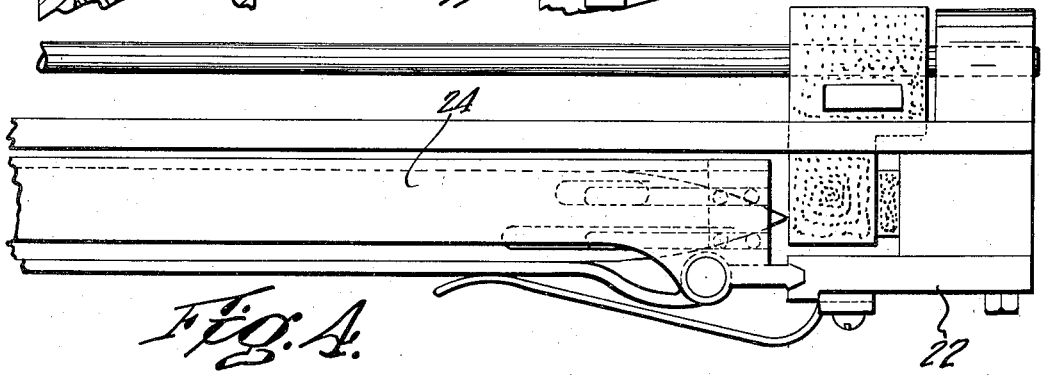

Aug. 4, 1936.  A. A. GORDON  2,049,584
ELECTRICAL WEFT DETECTING MECHANISM FOR PICK-AND-PICK LOOMS
Filed April 13, 1933  6 Sheets-Sheet 4

Inventor
A. A. Gordon
Southgate Hay & Hawley
Attorneys

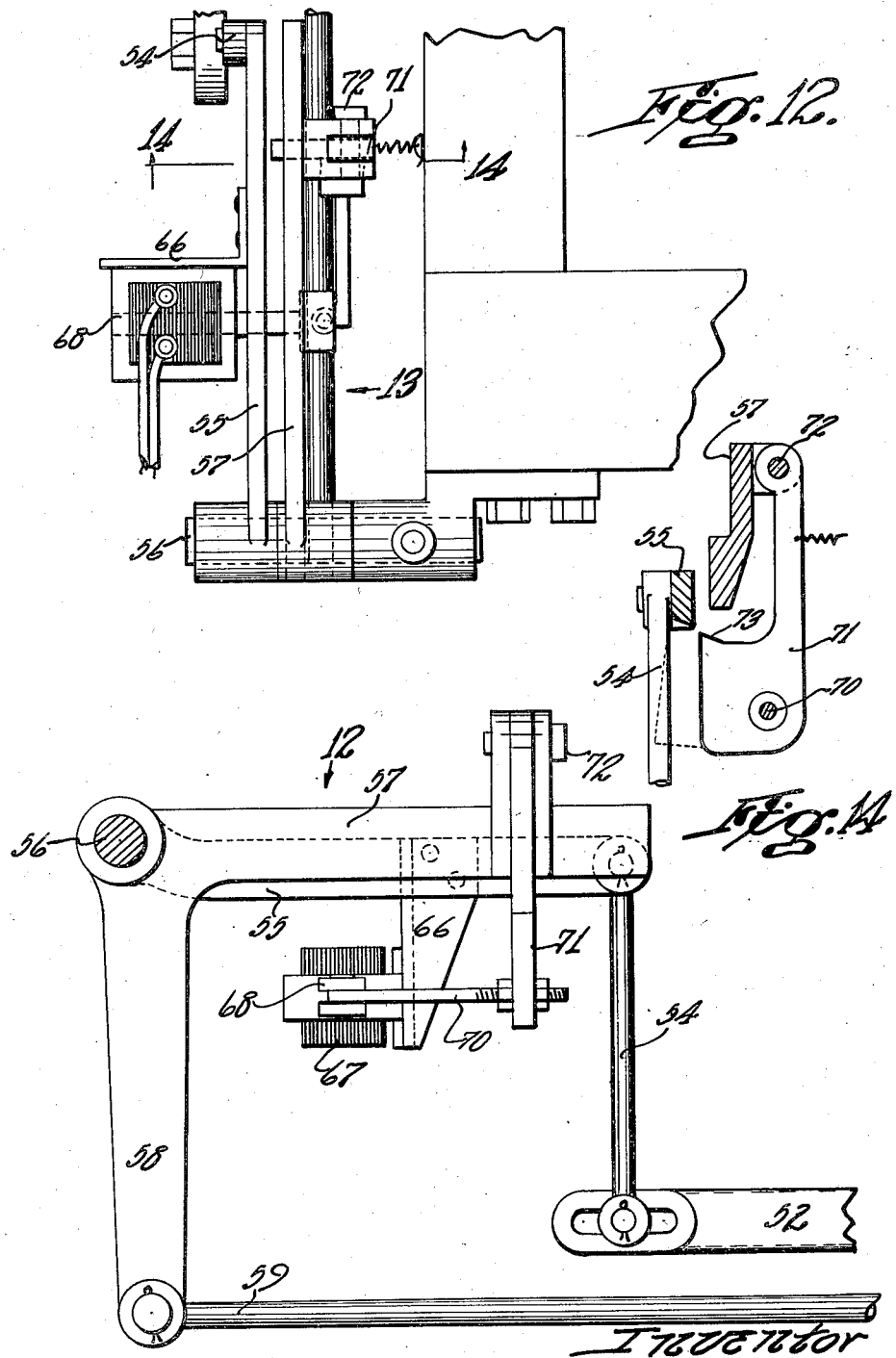

Aug. 4, 1936.   A. A. GORDON   2,049,584
ELECTRICAL WEFT DETECTING MECHANISM FOR PICK-AND-PICK LOOMS
Filed April 13, 1933   6 Sheets-Sheet 6

INVENTOR
A. A. GORDON
Southgate Fays Hawley
Attorneys

Patented Aug. 4, 1936

2,049,584

UNITED STATES PATENT OFFICE 2,049,584

ELECTRICAL WEFT DETECTING MECHANISM FOR PICK-AND-PICK LOOMS

Albert A. Gordon, Worcester, Mass., assignor to Crompton & Knowles Loom Works, Worcester, Mass., a corporation of Massachusetts Application April 13, 1933, Serial No. 665,919

5 Claims. (Cl. 139—233)

This invention relates primarily to pick-and-pick looms in which a plurality of drop boxes are provided at each side of the loom, and in which the number of shuttles to be automatically replenished with different kinds of weft does not exceed the number of boxes at the detecting side of the loom.

Furthermore, the invention relates to that type of pick-and-pick loom in which each particular shuttle to be automatically replenished with a separate kind of weft has its own assigned shuttle box at the detecting side of the loom and is never housed in any other shuttle box on that side. Additional shuttles may, if desired, be operated in said boxes but non-automatically as to weft replenishment.

It is the general object of my invention to provide an improved electrical weft detecting mechanism for such a loom, through the operation of which a substantially exhausted weft carrier in any automatically replenished shuttle will be replaced by a fresh weft carrier having the same kind or color of yarn.

My invention further relates to improved devices for coordinating the closing of certain electrical contacts with the movements of the drop boxes, so that only one electrical detector can become operative to give an indication at any one time. In the preferred form, the invention contemplates the closing of such circuits slightly in advance of the box change, if any.

My invention further relates to arrangements and combinations of parts which will be hereinafter described and more particularly pointed out in the appended claims.

A preferred form of the invention is shown in the drawings, in which

Fig. 3 is an enlarged partial front elevation of the drop boxes at the right-hand side of the loom;

Fig. 4 is a plan view thereof, looking in the direction of the arrow 4 in Fig. 3;

Fig. 5 is an enlarged sectional end elevation of one of the drop boxes, taken substantially along the line 5—5 in Fig. 3;

Fig. 6 is a perspective view of certain contact plates;

Fig. 12 is an enlarged plan view of certain transmitting mechanism shown in Fig. 1, and looking in the direction of the arrow 12 in Figs. 1 and 13;

Fig. 13 is a right-hand side elevation, looking in the direction of the arrow 13 in Fig. 12;

Fig. 14 is a detail sectional view, taken along the line 14—14 in Fig. 12;

Figure 1:
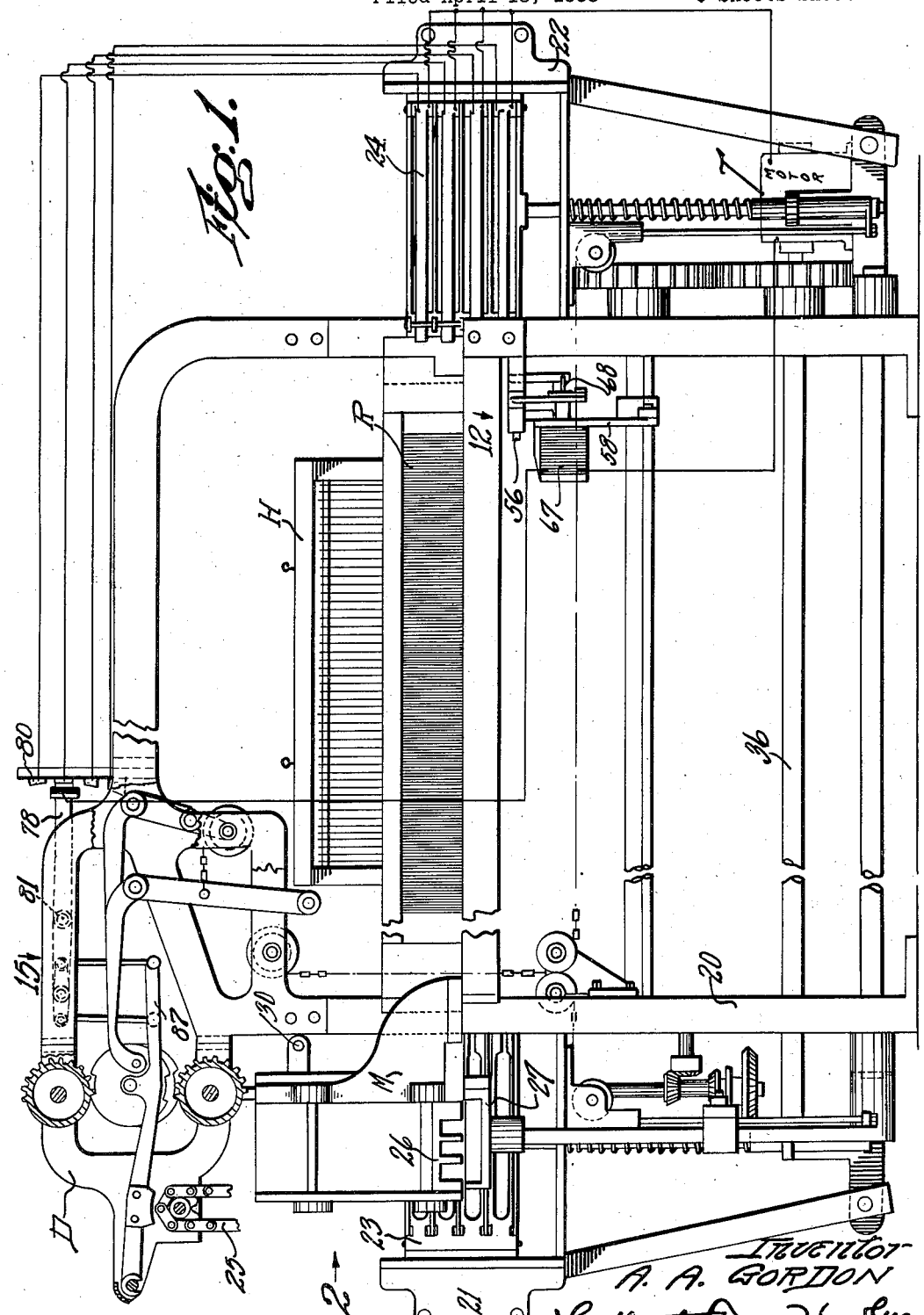
Fig. 1 is a front elevation of a drop box loom embodying my improvements.
Figure 2:
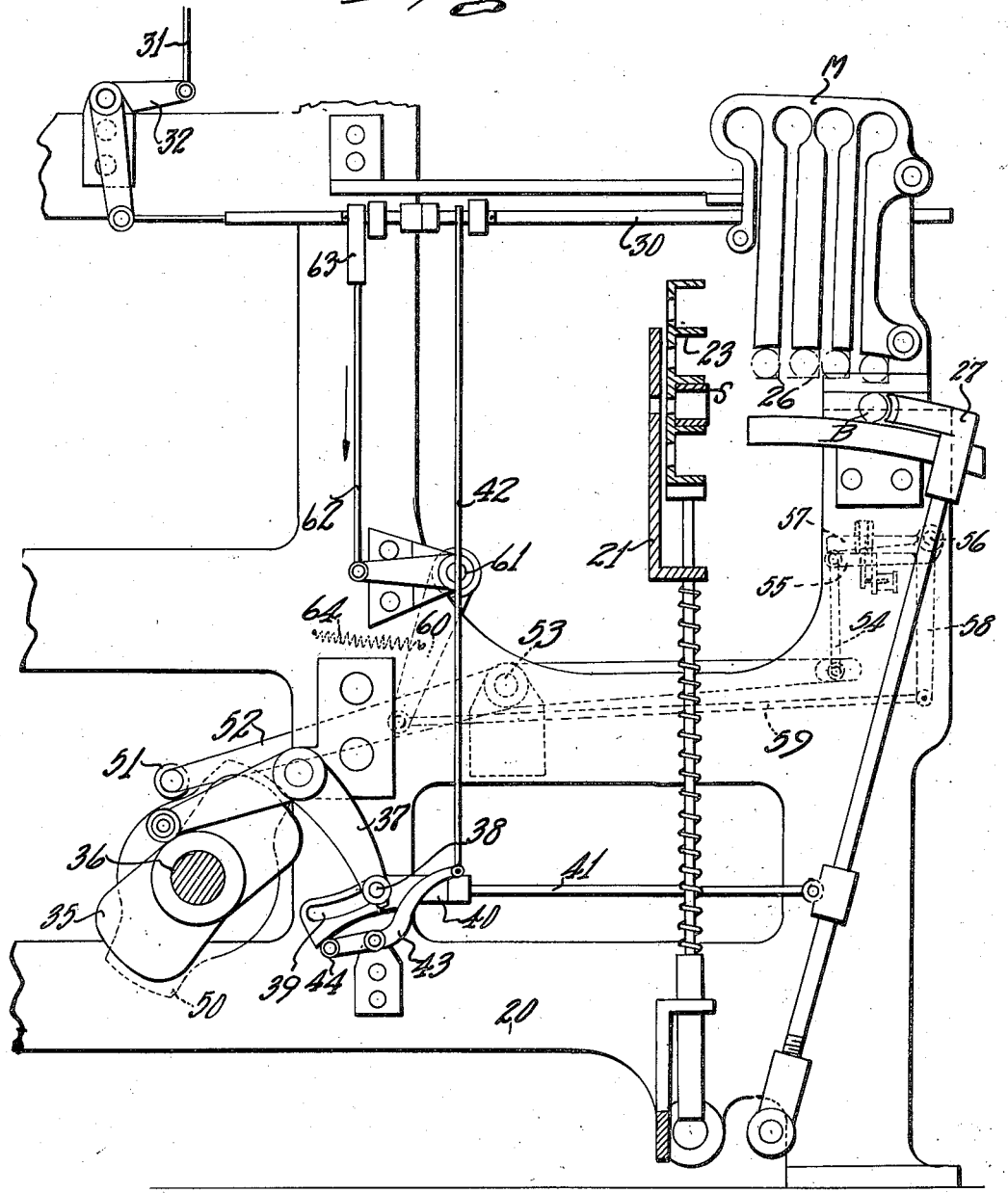
Fig. 2 is a partial left-hand side elevation of the loom, with certain parts shown in section.

Referring to Figs. 1 and 2, I have shown a pick-and-pick loom comprising a loom frame 20 having the usual reed R, harnesses H and dobby D. I have also indicated lay ends 21 and 22 in which drop boxes 23 and 24 are mounted for vertical sliding movement. The usual drop box mechanism (not shown in detail) is provided for raising and lowering the drop boxes in accordance with a pattern chain 25 in the dobby D.

A magazine M is mounted at the left-hand side of the loom and is provided with a series of bobbin holders 26 (Fig. 2), any one of which may be depressed to present a bobbin or weft carrier B in position for engagement by a transfer member 27.

The bobbin holders 26 are selectively depressed by arms on a rock shaft 30 (Fig. 2) which rock shaft may be shifted axially to select a bobbin holder and which may be rocked to depress the selected bobbin holder. Axial movement of the rock shaft 30 is effected through a link 31 and bell crank lever 32 by suitable connections to the drop boxes or to the pattern mechanism controlling the drop boxes. For the purposes of this application, it is sufficient to state that the rock shaft 30 is moved axially in predetermined relation to the vertical movements of the drop boxes on the detecting side of the loom.

The transfer member 27 is actuated by a cam 35 on a cam shaft 36, which cam engages a bell crank lever 37 having a stud 38 extending into an L-shaped slot 39 in a head 40 connected by a link 41 to the transfer member 27. When the head 40 is in the normal position shown in Fig. 2, the stud 38 oscillates freely in the segmental portion of the slot 39 and no movement of the transfer member 27 takes place.

Upon indication of weft exhaustion, the rock shaft 30 is given a rocking movement by actuating and transmitting mechanism to be described, and such movement of the rock shaft is communicated through a link 42 to a lever 43 having a roll 44 underlying the head 40.

When the rock shaft is rocked to depress a bobbin holder 26, the lever 43 is also moved to raise the head 40, so that the stud 38 is positioned in the offset end portion of the slot 39. The head 40 is then moved rearward by the rocking of the bell crank 37, thereby causing the transfer member 27 to transfer a fresh weft carrier or bobbin B to the indicated shuttle S.

For a more complete description of the parts thus far described, reference is made to my prior application Serial No. 499,038, filed November 29, 1930.

The means for rocking the shaft 30 comprises a second cam 50 on the cam shaft 36, engaging a cam roll 51 on a lever 52 pivoted at 53 and connected at its front end by a link 54 (Fig. 13) to a lever 55 mounted on a fixed stud 56. A second lever or bell crank 57 is mounted on the stud 56 and has a depending arm 58 connected by a link 59 (Fig. 2) to a bell crank 60 pivoted at 61 and connected by a link 62 to an arm 63 on the rock shaft 30. A spring 64 normally holds the link 62 in raised position.

A bracket 66 (Figs. 12 and 13) extends downward from the lever 55 and supports a solenoid coil 67. A plunger 68 is slidable in the coil 67 and is connected to a rod 70 fixed in a latch 71, which in turn is pivoted at 72 to the bell crank lever 57 previously described.

When the solenoid 67 is energized, the solenoid plunger acts through the rod 70 to swing the latch 71 to the dotted line position indicated in Fig. 14, in which position a shoulder 73 underlies the regularly actuated lever 55.

The lever 55 is thus operatively connected with the lever 57 and moves the same downward, thereby rocking the rock shaft 30 through the connections previously described and depressing a selected bobbin holder 26 in the path of the transfer member 27.

Figure 17:
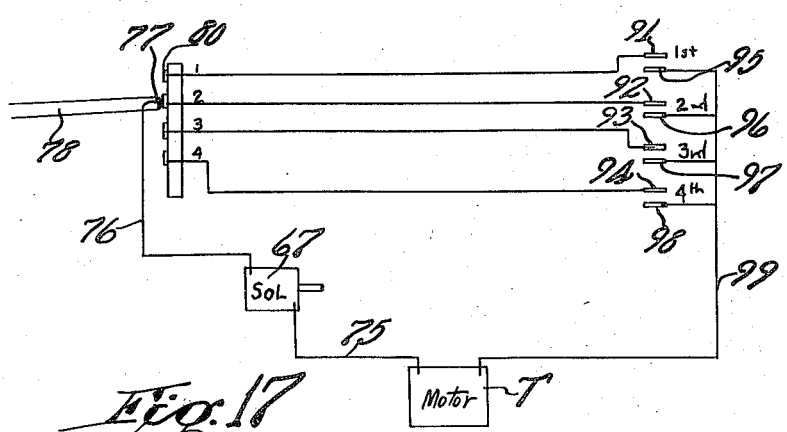
Fig. 17 is a diagrammatic view of certain electrical circuits.

The control circuit for the solenoid 67 is shown in Fig. 17, where the solenoid 67 is connected through a wire 75 to a portion of the winding of a driving motor T or to any other suitable source of electrical energy. The solenoid 67 is also connected by a wire 76 to a contact plate 77 on the end of a lever 78.

Figure 15:
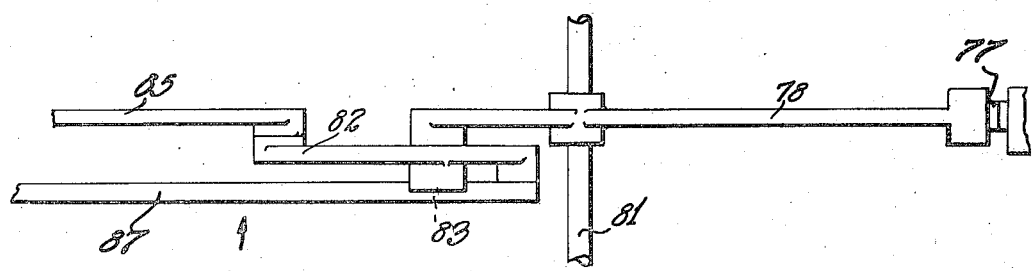
Fig. 15 is a plan view of certain compound levers, looking in the direction of the arrow 15 in Fig. 1.
Figure 16:
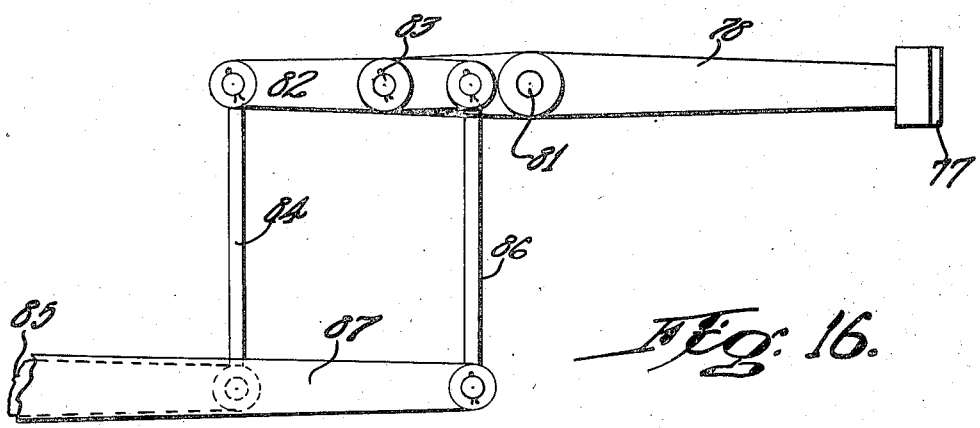
Fig. 16 is a side elevation, looking in the direction of the arrow 16 in Fig. 15.

The lever 78 is selectively moved to cause the contact plate 77 to engage any one of a series of contact plates 80 (Fig. 17) corresponding to the four drop boxes at the detecting side of the loom. The lever 78 is mounted on a fixed pivot shaft 81 (Figs. 15 and 16) and a lever 82 is pivoted at 83 on an extension of the lever 78.

The long arm of the lever 82 is connected by a link 84 to a lever 85, and the short arm of the lever 82 is connected by a link 86 to a lever 87. The levers 85 and 87 are controlled by the pattern chain 25 (Fig. 1) previously described and may form units in the usual series of vibrator levers in the dobby D.

By the provision of risers and sinkers on the pattern chain 25, the levers 85 and 87 may be selectively operated to move the contact plate 77 into engagement with any selected contact plate 80, such movement being associated and in harmony with the movement of the drop boxes at the detecting side of the loom.

In Fig. 17 I have indicated wires 1, 2, 3, and 4 connected to the contact plates 80, which plates are associated with the first, second, third and fourth drop boxes. These wires 1, 2, 3, and 4 are connected at their other ends to contact plates 91, 92, 93, and 94, associated with the corresponding drop boxes at the right-hand or weft detecting end of the loom.

Additional contact plates 95, 96, 97, and 98 are connected to a return wire 99 leading back to the winding in the driving motor T or to any other source of power for the solenoid 67.

It will thus appear that the control circuit 67 must be closed at two distinct points before the solenoid will be energized. In the first place, it must be closed by contact between the plate 77 and the plate 80 which corresponds to the active shuttle, and it must also be closed by contact between the pair of plates at the detecting end of the loom corresponding to the same shuttle.

The provision for closing the circuit between the latter pairs of plates, such as 91 and 95, is shown in detail in Figs. 3 to 11. Each shuttle S is provided with a contact plate 100 (Fig. 8) positioned for engagement by the corresponding contact members 91, 92, 93 or 94, and with a second contact plate 101, positioned for engagement by the corresponding contact members 95, 96, 97 or 98. The contact plate 100 is connected by a wire 102 to a rod 103 (Fig. 9) mounted on an inner side wall of the shuttle recess and having a contact arm 104 pivoted thereon and yieldingly moved toward the bobbin B by a light coil spring 105.

The bobbin B is provided with a metal ferrule or bushing 106 (Fig. 7) connected by a wire or plate 107 to the bobbin rings 108, which in turn are connected through the bobbin spring 109 and bolt 110 to the contact plate 101 previously described, which plate is engaged by one of the contact members 95 to 98.

Figure 7:
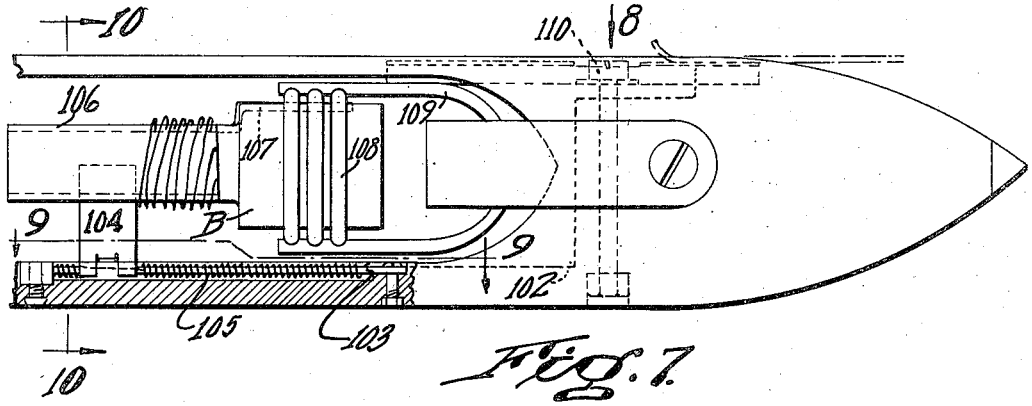
Fig. 7 is a partial plan view, partly in section, of a shuttle to be used with my improved detecting mechanism.
Figure 8:
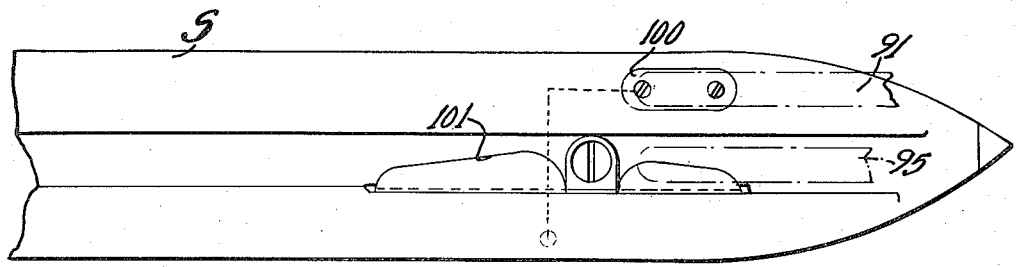
Fig. 8 is a side elevation thereof, looking in the direction of the arrow 8 in Fig. 7.
Figure 9:
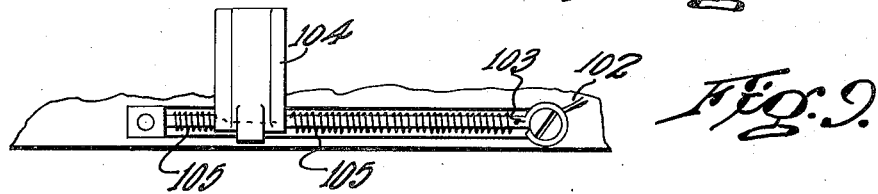
Fig. 9 is an enlarged detail side elevation, taken along the line 9—9 in Fig. 7.
Figures 10, 11:
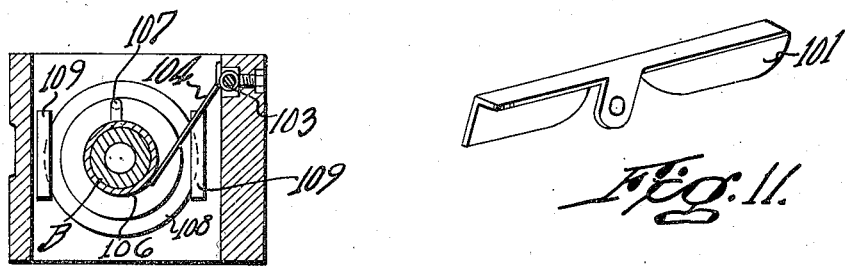
Fig. 10 is a sectional end view, taken along the line 10—10 in Fig. 7.
Fig. 11 is a perspective view of a contact plate to be described.

When the ferrule 106 is covered with a winding of weft thread, the arm 104 cannot engage therewith, and the circuit through the solenoid 67 will not be closed until the weft on the bobbin B is substantially exhausted as indicated in Fig. 7, at which time the arm 104 engages the ferrule 106. This completes the circuit and causes the solenoid to be energized, which in turn connects the actuating lever 55 with the lever 57, thus causing the rock shaft 30 to depress the corresponding bobbin holder 26 and to also act through the link 42 to raise the head 40 and connect the transfer member 27 for operation by the cam 35. The cams are so positioned that the shuttle will be replenished immediately upon arrival at the magazine side of the loom after indication of substantial weft exhaustion at the detecting side of the loom.

I thus provide detecting mechanism in each separate automatically replenished shuttle, and control circuits therefor which allow the detecting mechanism to indicate weft exhaustion only when the indicated shuttle is in active or running position, or is about to be moved to such position. With respect to all other shuttles, the circuits are open between the contact plate 77 and the contact plates 80 associated with said shuttles and no indication of weft exhaustion can be given as to any such shuttle until it is about to be moved to running position.

The detecting mechanism and control circuits as described are simple in construction and are directly associated with the pattern mechanism which controls the shuttle boxes, so that it is practically impossible for the indicating mechanism to get out of step with the shuttle boxes at the detecting side of the loom.

It will be obvious that the magazine and transfer mechanism shown in Fig. 2 will insert the fresh weft carrier in whatever shuttle is in active or running position at the magazine side of the loom on the next pick after indication of substantial weft exhaustion, and it will be further obvious that it is immaterial which of the drop boxes 23 contains the shuttle S at the time of transfer. Consequently the number or position of the drop boxes 23 at the magazine side of the loom need not correspond to the number or position of the shuttle boxes 24 at the detecting side of the loom.

Instead of a 4 x 4 loom, I may apply my invention to a 4 x 3 loom or even to a 4 x 1 loom if pick and pick operation is not essential. Furthermore, by disabling the drop box mechanism at the magazine side of the loom, I can run a 4 x 4 loom or a 4 x 3 loom as a 4 x 1 loom when weaving fabrics in which single picks are not required.

I can also use extra shuttles in addition to the shuttles corresponding to the boxes 24 at the detecting side of the loom, provided only that these extra shuttles omit the electrical contacts shown in Figs. 7 to 11, so that they cannot complete an indicating circuit of the detecting mechanism but are controlled simply by the usual weft fork and filling stop motion. As these extra shuttles cannot indicate weft replenishment, they may be received in any empty box on either side of the loom, thus providing increased elasticity of operation.

Having thus described my invention and the advantages thereof, I do not wish to be limited to the details herein disclosed, otherwise than as set forth in the claims, but what I claim is:—

1. In a weft replenishing loom having a plurality of drop boxes at the detecting side thereof and shuttles for said boxes, in combination, a weft replenishing magazine containing bobbins with different kinds or colors of yarn, means to selectively deliver said bobbins to transfer position, a separate detecting device in each shuttle making electrical contact therein on substantial exhaustion of weft in said shuttle, bobbin-transfer mechanism for said magazine, a regularly operated actuator for said transfer mechanism, a normally inoperative connection between said actuator and said transfer mechanism, an electrical device controlling said connection, a separate electric circuit for each of said electrical detectors, and pattern-controlled means effective to connect said electrical controlling device to the circuit of the shuttle to be next picked from the detecting side of the loom, said latter means including a contact member in each circuit, a single contact arm movable to selectively engage said contact members, and means directly actuated by a pattern chain for positioning said contact arm and maintaining said contact engagement during shifting of the boxes to bring said shuttle to running position.

2. In a weft replenishing loom having a plurality of drop boxes at the detecting side thereof and shuttles for said boxes, in combination, a weft replenishing magazine containing bobbins with different kinds or colors of yarn, means to selectively deliver said bobbins to transfer position, a separate detecting device in each shuttle making electrical contact therein on substantial exhaustion of weft in said shuttle, bobbin-transfer mechanism for said magazine, a regularly operated actuator for said transfer mechanism, a normally inoperative connection between said actuator and said transfer mechanism, an electrical device controlling said connection, a separate electric circuit for each of said electrical detectors, and pattern-controlled means effective to connect said electrical controlling device to the circuit of the shuttle about to be picked from the detecting side of the loom, said latter means including a contact member in each circuit, a contact arm movable to selectively engage said contact members, and means directly actuated by a pattern chain for positioning said contact arm and comprising two pattern levers and compound levers positioned thereby.

3. In a weft replenishing loom having a plurality of drop boxes at the detecting side thereof and shuttles for said boxes, in combination, a weft replenishing magazine containing bobbins with different kinds or colors of yarn, means to selectively deliver said bobbins to transfer position, a separate detecting device in each shuttle making electrical contact therein on substantial exhaustion of weft in said shuttle, bobbin-transfer mechanism for said magazine, a regularly operated actuator for said transfer mechanism, a normally inoperative connection between said actuator and said transfer mechanism, an electrical device controlling said connection, a separate electric circuit for each of said electrical detectors, and pattern-controlled means effective to connect said electrical controlling device to the circuit of the shuttle to be next picked from the detecting side of the loom, said latter means including a contact member in each circuit, a single contact arm movable to selectively engage said contact members, and means directly actuated by a pattern chain for positioning said contact arm prior to the movement of the drop boxes at the detecting side and maintaining said contact engagement during shifting of the boxes to bring said shuttle to running position.

4. A weft replenishing pick-and-pick loom having a plurality of drop boxes at both sides and shuttles for said boxes, in combination with a weft replenishing magazine at one side containing bobbins with different kinds or colors of yarn, means to selectively deliver said bobbins to transfer position, a separate detecting device in each shuttle making electrical contact therein on substantial exhaustion of weft in said shuttle, bobbin-transfer mechanism for said magazine, a regularly operated actuator for said transfer mechanism, a normally inoperative connection between said actuator and said transfer mechanism, an electrical device controlling said connection, a separate electric circuit for each of said electrical detectors, and pattern-controlled means effective to connect said electrical controlling device to the circuit of the shuttle to be next picked from the detecting side of the loom, said connection being first made just before the boxes are shifted and said circuit being maintained during subsequent shifting of the boxes to bring the indicated shuttle to running position and said bobbin transfer mechanism thereafter operating to insert a fresh bobbin in the indicated shuttle between the first and the second pick of the loom following indication of substantial weft exhaustion in said shuttle.

5. A weft replenishing pick-and-pick loom having a plurality of drop boxes at both sides and shuttles for said boxes, in combination with a weft replenishing magazine at one side containing bobbins with different kinds or colors of yarn, means to selectively deliver said bobbins to transfer position, a separate detecting device in each shuttle making electrical contact therein on substantial exhaustion of weft in said shuttle, bobbin-transfer mechanism for said magazine, a regularly operated actuator for said transfer mechanism, a normally inoperative connection between said actuator and said transfer mechanism, an electrical device controlling said connection, a separate electric circuit for each of said electrical detectors, and pattern-controlled means effective to connect said electrical controlling device to the circuit of the shuttle to be next picked from the detecting side of the loom just prior to the movement of the drop boxes at the detecting side to bring said indicated shuttle to running position, and said bobbin transfer mechanism thereafter operating to insert a fresh bobbin in the indicated shuttle between the first and the second pick of the loom following indication of substantial weft exhaustion in said indicated shuttle.

ALBERT A. GORDON.